(12) United States Patent
Nakahata

(10) Patent No.: US 8,564,650 B2
(45) Date of Patent: Oct. 22, 2013

(54) APPARATUS AND METHOD FOR CHANGING AN OPEN PERIOD FOR RIGHT AND LEFT EYE SHUTTERS OF A PAIR OF VIEWING GLASSES

(75) Inventor: Yuji Nakahata, Kanagawa (JP)

(73) Assignee: Sony Corporation (JP)

( * ) Notice: Subject to any disclaimer, the term of this patent is extended or adjusted under 35 U.S.C. 154(b) by 434 days.

(21) Appl. No.: 12/807,284

(22) Filed: Sep. 1, 2010

(65) Prior Publication Data

US 2011/0074937 A1  Mar. 31, 2011

(30) Foreign Application Priority Data

Sep. 25, 2009  (JP) ................. P2009-220478

(51) Int. Cl.
*H04N 15/00* (2006.01)
*H04N 13/04* (2006.01)
*H04N 9/73* (2006.01)
*H04N 9/12* (2006.01)
*H04N 9/87* (2006.01)

(52) U.S. Cl.
USPC .............................. 348/56; 348/55

(58) Field of Classification Search
USPC ...................................... 348/56, 55
See application file for complete search history.

(56) References Cited

U.S. PATENT DOCUMENTS

| 5,870,137 | A  | * | 2/1999  | Stuettler ........................ 348/51 |
| 6,456,432 | B1 | * | 9/2002  | Lazzaro et al. ............... 359/464 |
| 8,066,377 | B1 | * | 11/2011 | Husak et al. ..................... 353/7 |
| 8,130,259 | B2 | * | 3/2012  | Ishiyama et al. .............. 348/51 |
| 2004/0130645 | A1 | * | 7/2004  | Ohmura et al. .......... 348/333.08 |
| 2005/0264717 | A1 | * | 12/2005 | Chien et al. ..................... 349/61 |
| 2008/0024598 | A1 | * | 1/2008  | Perlin et al. ..................... 348/55 |
| 2008/0084513 | A1 | * | 4/2008  | Brott et al. ...................... 349/15 |
| 2010/0231698 | A1 | * | 9/2010  | Nakahata et al. ............... 348/56 |

(Continued)

FOREIGN PATENT DOCUMENTS

| JP | 09-138384 A    | 5/1997   |
| JP | 2000-036969 A  | 2/2000   |
| JP | 2003-045343 A  | 2/2003   |
| JP | 2009230071 A   | * 10/2009 |

OTHER PUBLICATIONS

C.G. Song & S.K. Park, "Performance Evaluation of Stereo Endoscopic Imaging System Incorporating TFT-LCD", 29 J. of Med. Eng. & Tech. 244-250 (Oct. 2005).*

*Primary Examiner* — David Czekaj
*Assistant Examiner* — David N Werner
(74) *Attorney, Agent, or Firm* — Lerner, David, Littenberg, Krumholz & Mentlik, LLP

(57) ABSTRACT

An image displaying apparatus includes a signal control unit for receiving an input image signal and converting the signal into a signal for alternately displaying a right-eye image and a left-eye image, display panel into which the signal converted in the signal control unit is input for the right-eye image and the left-eye image, a surface light source for illuminating the display panel from its back, a shutter control unit for generating a timing signal indicating a period in which the right-eye and left-eye shutters are opened for a pair of viewing glasses with the right-eye and left-eye shutters, and for relatively changing the shutter-opened period for the emission timing of the surface light source, and a surface light source control unit for emitting the surface light source in a shorter period than the shutter-opened period in response to the switching between the right-eye image and the left-eye image.

12 Claims, 7 Drawing Sheets

(56) References Cited

U.S. PATENT DOCUMENTS

2010/0289883 A1* 11/2010 Goris et al. ............... 348/56
2011/0007140 A1* 1/2011 Nakahata et al. ........... 348/56
2011/0187838 A1* 8/2011 Price ...................... 348/53
2012/0007969 A1* 1/2012 Lin ........................ 348/56

* cited by examiner

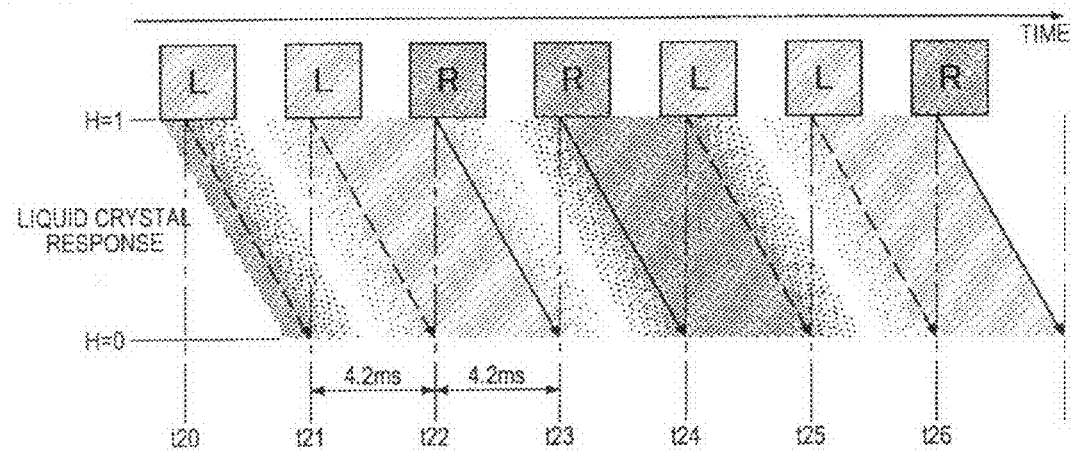
FIG.5A
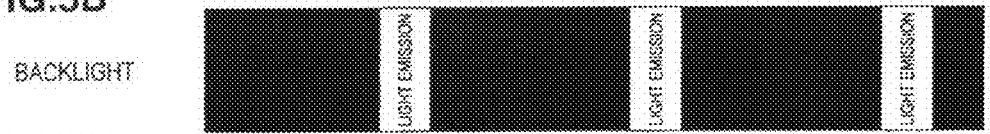
FIG.5B BACKLIGHT
FIG.5C LOW TEMPERATURE
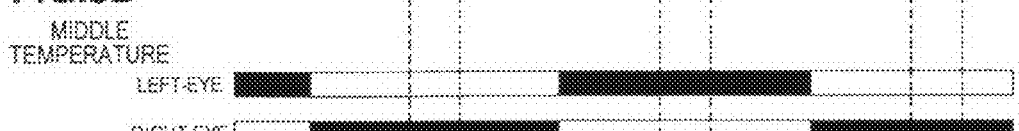
FIG.5D MIDDLE TEMPERATURE
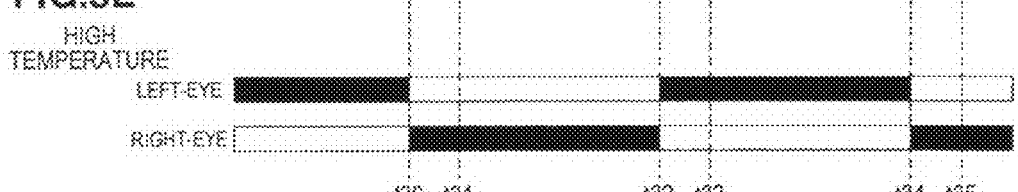
FIG.5E HIGH TEMPERATURE

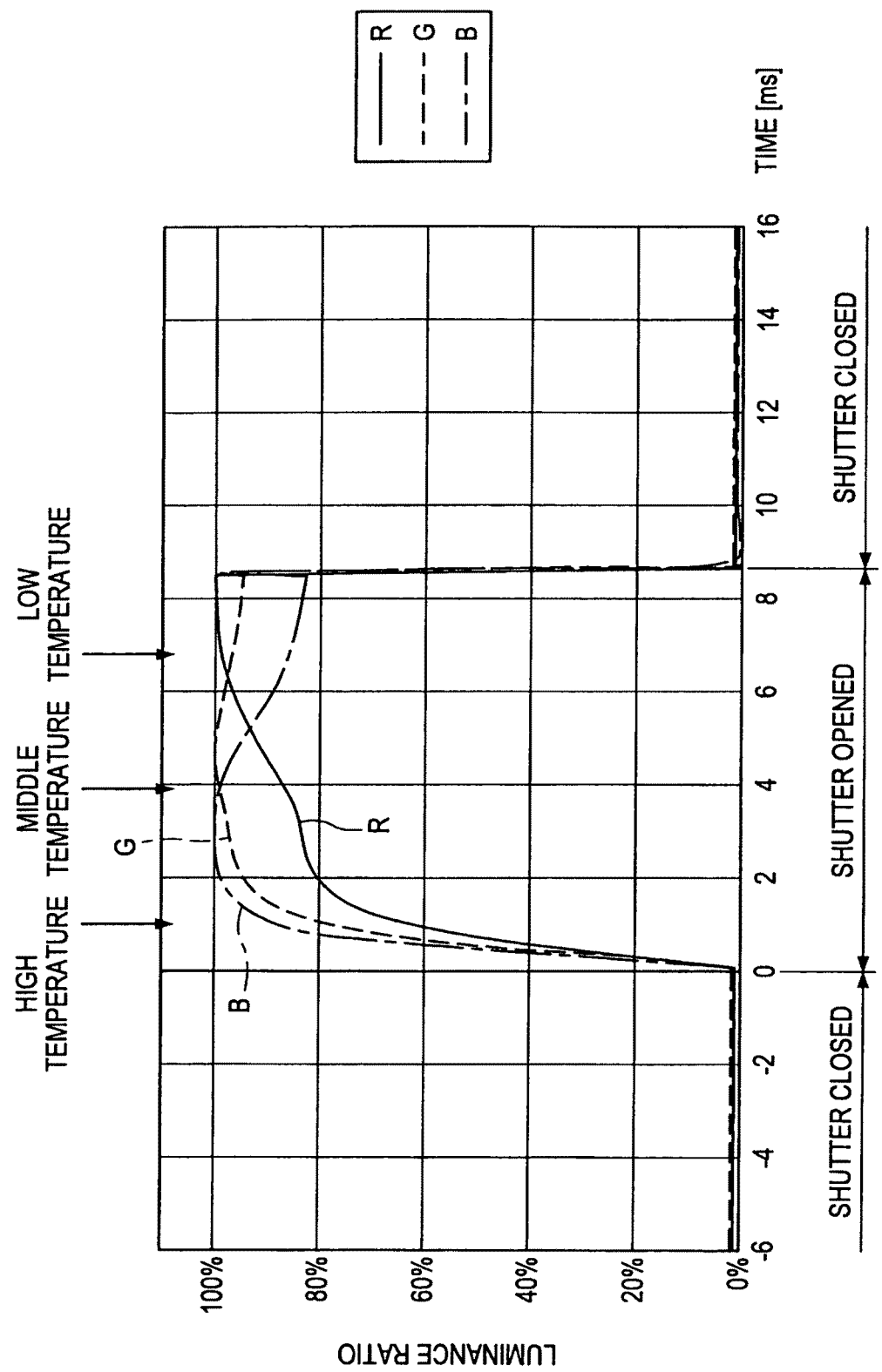

APPARATUS AND METHOD FOR CHANGING AN OPEN PERIOD FOR RIGHT AND LEFT EYE SHUTTERS OF A PAIR OF VIEWING GLASSES

CROSS-REFERENCE TO RELATED APPLICATION

The present application claims priority from Japanese Patent Application No. JP 2009-220478 filed in the Japanese Patent Office on Sep. 25, 2009, the entire content of which is incorporated herein by reference.

BACKGROUND OF THE INVENTION

1. Field of the Invention

The present invention relates to an image displaying apparatus, an image display observing system and an image displaying method.

2. Description of the Related Art

In related art, as described in Japanese Patent Application Laid-Open Nos. 9-138384, 2000-36969, and 2003-45343 for example, there is known a method for alternately supplying a left-eye image and a right-eye image, both of which have a disparity, to a display at a predetermined period and observing the images with a pair of glasses including liquid crystal shutters driven in synchronization with the predetermined period.

SUMMARY OF THE INVENTION

A typical 2D television receiver includes a display mode or a function capable of changing an image color (color temperature) through user setting, and naturally a similar function is needed for a 3 D image displaying apparatus. However, when the color temperature is corrected at the display side, color temperatures of the colors other than the desired color temperature need to be adjusted by restricting luminance. In this case, the luminance of the image is lowered in accordance with the adjustment of the color temperature, and there will occur an issue that a user may not recognize a vivid video with high luminance.

In light of the foregoing, it is desirable to provide a novel and improved image displaying apparatus, image display observing system and image displaying method capable of restricting a decrease in luminance and optimally adjusting the color of the image.

According to an embodiment of the present invention, there is provided an image displaying apparatus includes a signal control unit for receiving an input image signal and converting the signal into a signal for alternately displaying a right-eye image and a left-eye image, display panel into which the signal converted in the signal control unit is input for alternately displaying the right-eye image and the left-eye image, a surface light source for illuminating the display panel from its back, a shutter control unit for generating a timing signal indicating a period in which the right-eye and left-eye shutters are opened for a pair of viewing glasses with the right-eye and left-eye shutters, and for relatively changing the shutter-opened period for the emission timing of the surface light source, and a surface light source control unit for emitting the surface light source in a shorter period than the shutter-opened period in response to the switching between the right-eye image and the left-eye image.

In this configuration, the image displaying apparatus includes an input unit into which information for adjusting an image color is input, the shutter control unit changes the shutter-opened period based on the information input into the input unit.

In this configuration, when information for increasing a color temperature of an image is input into the input unit, the timing control unit relatively delays a timing of the shutter-opened period for the emission timing of the surface light source.

In this configuration, when information for reducing a color temperature of an image is input into the input unit, the shutter control unit relatively quickens a timing of the shutter-opened period for the emission timing of the surface light source.

In this configuration, the shutter is of STN type, TN type, VA type or OCB type liquid crystal.

In this configuration, the signal control unit converts the right-eye video signal and the left-eye video signal into the signals such that the same signal is consecutively displayed at least twice, respectively.

In this configuration, the surface light source control unit emits the surface light source during at least part of the second display period of the right-eye image and the left-eye image.

In this configuration, the surface light source control unit does not emit the surface light source during at least part of the first display period of the right-eye image and the left-eye image.

According to another embodiment of the present invention, there is provided an image display observing system includes an image displaying apparatus and viewing glasses. The image displaying apparatus includes a signal control unit for receiving an input image signal and converting the signal into a signal for alternately displaying a right-eye image and a left-eye image, a display panel into which the signal converted in the signal control unit is input for alternately displaying the right-eye image and the left-eye image, a surface light source for illuminating the display panel from its back, a shutter control unit for generating a timing signal indicating a period in which the right-eye and left-eye shutters are opened for a pair of viewing glasses with the right-eye and left-eye shutters, and for relatively changing the shutter-opened period for the emission timing of the surface light source, and a surface light source control unit for emitting the surface light source in a shorter period than the shutter-opened period in response to the switching between the right-eye image and the left-eye image. The viewing glasses are provided with the right-eye and left-eye shutters for alternately opening the right-eye and left-eye shutters based on the timing signal.

According to another embodiment of the present invention, there is provided an image displaying method includes the steps of, receiving an input image signal and converting the signal into a signal for alternately displaying a right-eye image and a left-eye image, alternately displaying the right-eye image and the left-eye image based on the converted signal, generating a timing signal indicating a period in which the right-eye and left-eye shutters are opened for a pair of viewing glasses with the right-eye and left-eye shutters, and for relatively changing the shutter-opened period for the emission timing of the surface light source of the display panel for displaying the right-eye image and the left-eye image, and emitting the surface light source in a shorter period than the shutter-opened period in response to the switching between the right-eye image and the left-eye image.

According to another embodiment of the present invention, there is provided an image displaying apparatus includes a signal control unit for receiving an input image signal and converting the signal into a signal for periodically displaying multiple different images, a display panel into which the signal converted in the signal control unit is input for periodically displaying the multiple different images, a surface light source for illuminating the display panel from its back, a shutter control unit for generating a timing signal indicating a period in which the right-eye and left-eye shutters are simultaneously opened at a timing of displaying the multiple different images for a pair of viewing glasses with the right-eye and left-eye shutters, and for relatively changing the shutter-opened period for the emission timing of the surface light source, and a surface light source control unit for emitting the surface light source in a shorter period than the shutter-opened period in response to the switching between the right-eye image and the left-eye image.

According to another embodiment of the present invention, there is provided an image display observing system includes an image displaying apparatus and viewing glasses. The displaying apparatus includes a signal control unit for receiving an input image signal and converting the signal into a signal for periodically displaying multiple different images, a display panel into which the signal converted in the signal control unit is input for periodically displaying the multiple different images, a surface light source for illuminating the display panel from its back, a shutter control unit for generating a timing signal indicating a period in which the right-eye and left-eye shutters are simultaneously opened at a timing of displaying the multiple different images for a pair of viewing glasses with the right-eye and left-eye shutters, and for relatively changing the shutter-opened period for the emission timing of the surface light source, and a surface light source control unit for emitting the surface light source in a shorter period than the shutter-opened period in response to the switching between the right-eye image and the left-eye image. The viewing glasses are provided with the right-eye and left-eye shutters for alternately opening the right-eye and left-eye shutters based on the timing signal.

According to another embodiment of the present invention, there is provided an image displaying includes the steps of, outputting a signal for periodically displaying multiple different images, periodically displaying the multiple different images based on the signal, generating a timing signal indicating a period in which the right-eye and left-eye shutters are simultaneously opened at a timing of displaying the multiple different images for a pair of viewing glasses with the right-eye and left-eye shutters, and for relatively changing the shutter-opened period for the emission timing of the surface light source of the display panel, and emitting the surface light source in a shorter period than the shutter-opened period in response to the switching between the right-eye image and the left-eye image.

According to the embodiment of the present invention, it is possible to restrict luminance from lowering and to optimally adjust an image color.

BRIEF DESCRIPTION OF THE DRAWINGS

FIGS. 5A-5E are schematic diagrams showing an example in which an opening period of the liquid crystal shutter is changeable with respect to FIG. 3;

FIG. 6 is a characteristic diagram showing the same characteristics as those of FIG. 4 and showing how a color temperature changes in response to an illumination timing of a backlight.

DETAILED DESCRIPTION OF THE EMBODIMENT

Figure 1:
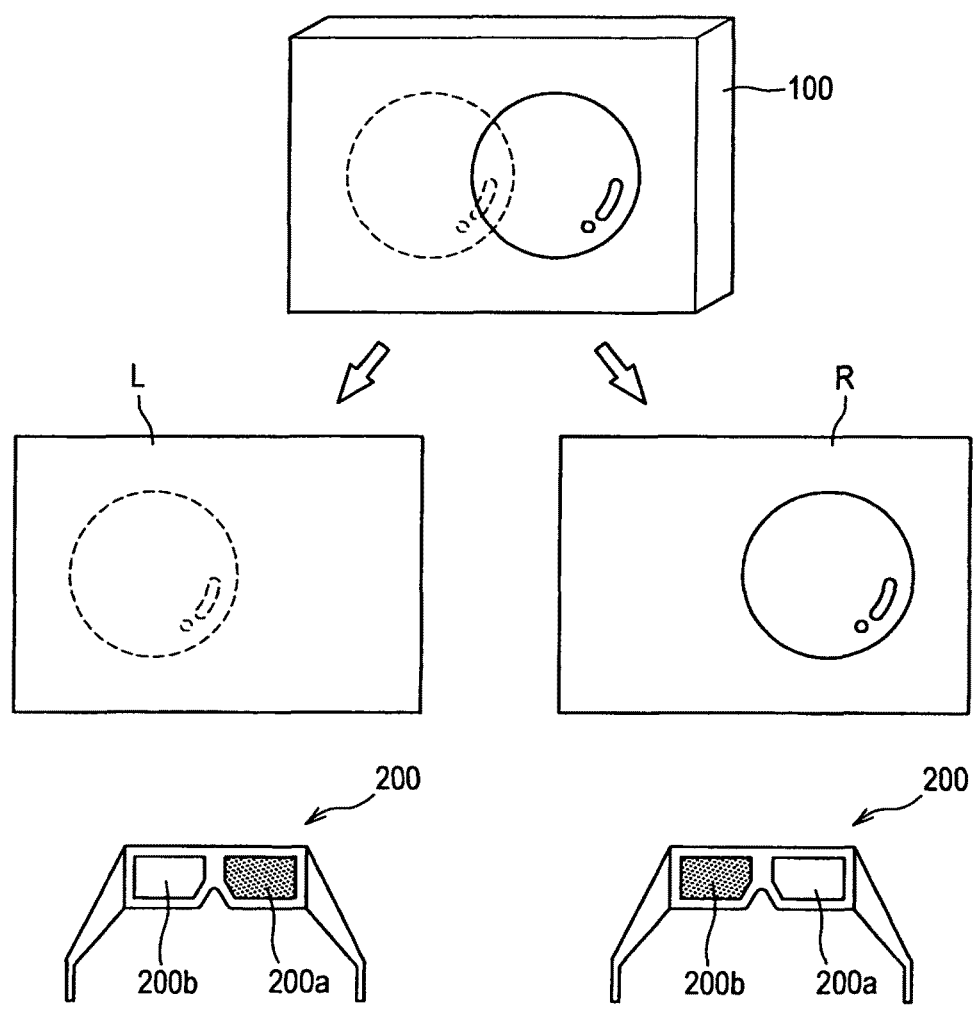
FIG. 1 is a schematic diagram showing a stereoscopic image display observing system according to one embodiment of the present invention.

Hereinafter, a preferred embodiment of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
(1) Structure example of system
(2) Structure example of image displaying apparatus
(3) Example of double writing according to the embodiment
(4) Synchronization Between Backlight and Shutter Opening/Closing
(5) Color temperature adjustment using difference in response characteristics for each color in liquid crystal
(6) Control and others of backlight OFF period
(7) Application to system for periodically displaying multiple different images

[(1) Structure Example of System]

FIG. 1 is a schematic diagram showing a structure of a stereoscopic image display observing system according to one embodiment of the present invention. As shown in FIG. 1, the system according to the embodiment includes an image displaying apparatus 100 made of a LCD and a pair of display image viewing glasses 200.

The image displaying apparatus 100 is a time-division stereoscopic video displaying apparatus, for example, and alternately displays a left-eye video and a right-eye video on the entire screen at a very short period. The image displaying apparatus 100 separates and provides the videos to the left-eye and the right-eye in synchronization with the display period of the left-eye video and the right-eye video. The image displaying apparatus 100 alternately displays a right-eye image R and a left-eye image L for each field, for example. The display image viewing glasses 200 are provided with a pair of liquid crystal shutters 200a and 200b at the parts corresponding to the lenses. The liquid crystal shutters 200a and 200b alternately perform opening/closing operation in synchronization with the image switching for each field of the image displaying apparatus 100. In other words, in the field in which the right-eye image R is displayed on the image displaying apparatus 100, the left-eye liquid crystal shutter 200b is closed and the right-eye liquid crystal shutter 200a is opened. On the contrary, in the field in which the left-eye image L is displayed, the operation contrary to the above operation is performed. In this way, the image displaying apparatus 100 alternately displays the left-eye video L and the right-eye video R on the entire screen at a very short period, and additionally separates and provides the videos to the left-eye and the right-eye in synchronization with the display period of the left-eye video L and the right-eye video R.

With the operations, only the right-eye image R or the left-eye image L is incident into the right-eye or the left-eye of the user who views the image displaying apparatus 100 with the viewing glasses 200. Thus, the right-eye and left-eye images are combined inside the eyes of the viewer and the image displayed on the image displaying apparatus 100 is stereoscopically recognized. The image displaying apparatus 100 can also display a typical 2D image and in this case the right-eye image R and the left-eye image L are not switched.

[(2) Structure Example of Image Displaying Apparatus]

Figure 2:
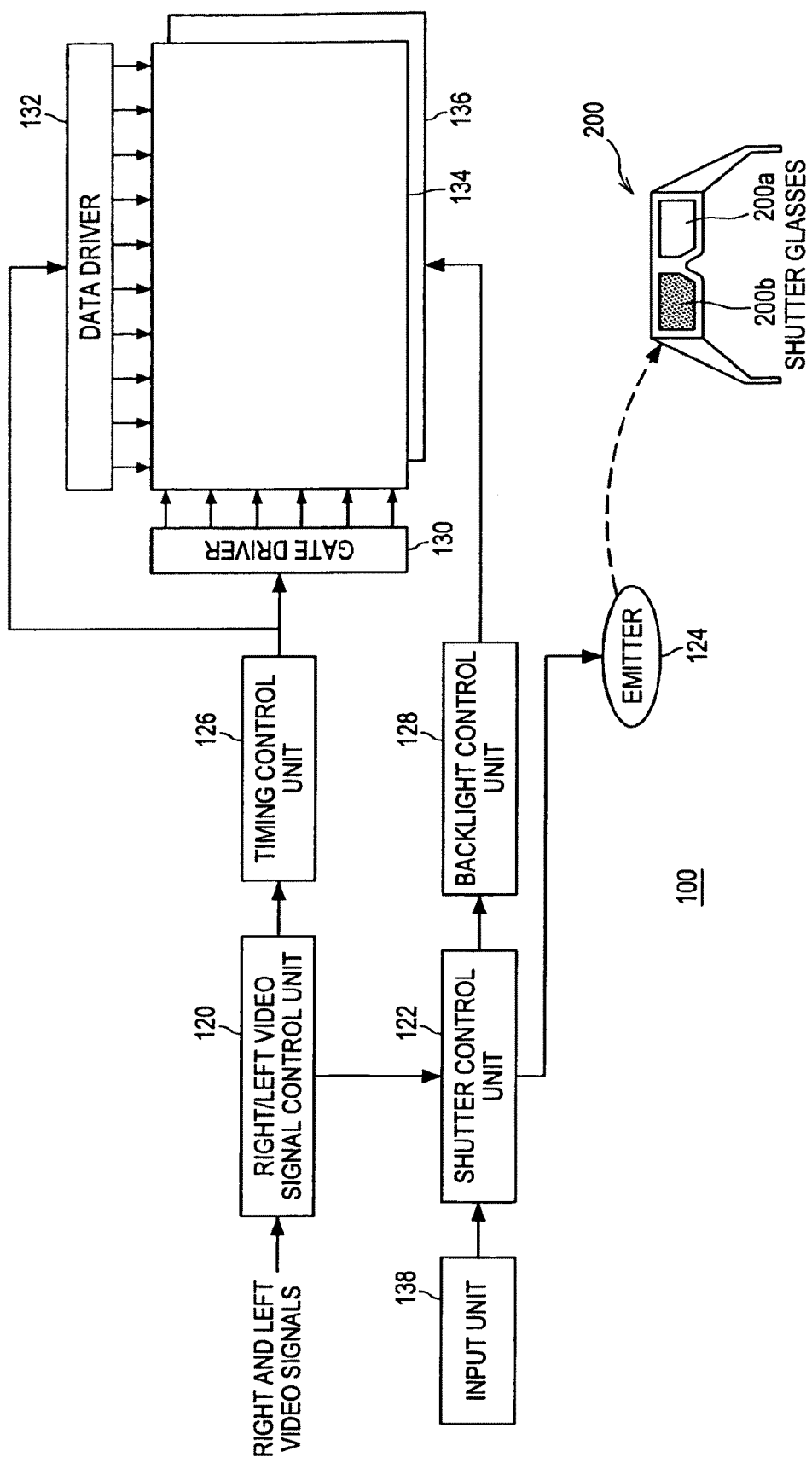
FIG. 2 is a block diagram showing a structure of an image displaying apparatus.

A structure of the image displaying apparatus 100 will be described below. FIG. 2 is a block diagram showing the structure of the image displaying apparatus 100. As shown in FIG. 2, the image displaying apparatus 100 includes a video signal control unit 120, a shutter control unit 122, an emitter 124, a timing control unit 126, a backlight control unit 128, a gate driver 130, a data driver 132, a liquid crystal display panel 134 and an input unit 138. A backlight (surface light source) 136 is arranged behind the liquid crystal display panel 134.

The liquid crystal display panel 134 includes a liquid crystal layer, opposite transparent electrodes across the liquid crystal layer, and a color filter. The remaining light characteristic of a phosphor constituting the backlight is set to be 4 ms or less. The backlight 136 includes a LED excellent in the remaining light characteristics.

The right and left video signals for displaying the right-eye image R and the left-eye image L are input into the video signal control unit 120. The video signal control unit 120 alternately outputs the right and left video signals for alternately displaying the right-eye image R and the left-eye image L on the liquid crystal display panel 134. The video signal control unit 120 converts the right-eye video signal and the left-eye video signal for performing the double writing based on the input right and left video signals such that two of the same signals are consecutive.

The right-eye video signal and the left-eye video signal, which are converted in the video signal control unit 120, are input into the timing control unit 126. The timing control unit 126 converts the input right-eye video signal and left-eye video signal into the signals to be input into the liquid crystal display panel 134, and generates a pulse signal to be used for the operations in the gate driver 130 and the data driver 132.

The signal converted in the timing control unit 126 is input into the gate driver 130 and the data driver 132, respectively. The gate driver 130 and the data driver 132 receive the pulse signal generated in the timing control unit 126 and emit each pixel of the liquid crystal display panel 134 based on the input signal. Thus, the video is displayed on the liquid crystal display panel 134.

The video signal control unit 120 sends, to the shutter control unit 122, the timing signal indicating a timing of switching the right-eye video signal and the left-eye video signal which are converted to be two-consecutive. The shutter control unit 122 sends a drive signal for emitting the emitter 124 to the emitter 124 based on the timing signal sent from the video signal control unit 120. The drive signal for emitting the emitter 124 is a signal containing the opening/closing timing of the liquid crystal shutters 200a and 200b, and the shutter control unit 122 controls the opening/closing timing of the liquid crystal shutters 200a and 200b based on the timing signal sent from the video signal control unit 120 and the information input from the input unit 138 described later. The emitter 124 sends an optical signal indicating the opening/closing timing of the right and left liquid crystal shutters 200a and 200b to the viewing glasses 200 based on the drive signal sent from the shutter control unit 122.

Though not described in detail, the display image viewing glasses 200 include a sensor for receiving an optical signal. The viewing glasses 200 which have received the optical signal perform the alternate opening/closing operation of the liquid crystal shutters 200a and 200b in synchronization with the opening/closing timing of the liquid crystal shutters 200a and 200b indicated by the optical signal.

The shutter control unit 122 sends the timing signal indicating the timing of switching the right and left videos to the backlight control unit 128. The backlight control unit 128 outputs a control signal for lighting the backlight 136 based on the input timing signal. The backlight 136 is lit based on the control signal input from the backlight control unit 128.

The information on user-designated image color (color temperature) is input into the input unit 138 via an operation button, mouse or keyboard provided in the image displaying apparatus 100. The information input into the input unit 138 is sent to the shutter control unit 122. The shutter control unit 122 controls the opening/closing timing of the right and left liquid crystal shutters 200a and 200b based on the information on image color. Then, as described above, the shutter control unit 122 sends a drive signal for emitting the emitter 124 to the emitter 124 based on the opening/closing timing determined based on the information on color temperature. The information on color temperature to be input into the input unit 138 may be input by analyzing the image in addition to the user-input images.

In the embodiment, the opening/closing timing of the liquid crystal shutters 200a and 200b is determined based on the information on color temperature in the shutter control unit 122 of the image displaying apparatus 100 but the opening/closing timing may be controlled at the display image viewing glasses 200 side. In this case, the shutter control unit 122 sends the drive signal for emitting the emitter 124 to the emitter 124 based on the timing signal sent from the video signal control unit 120, and sends the information input into the input unit 138 to the emitter 124. The emitter 124 sends the information input into the input unit 138 as well as the optical signal indicating the timing of switching the right and left video signals to the viewing glasses 200. Then, the viewing glasses 200 which have received the optical signal perform the alternate opening/closing operation of the liquid crystal shutters 200a and 200b in synchronization with the timing of switching the right-eye video signal and the left-eye video signal in the image displaying apparatus 100, and changes the opening/closing timing of the liquid crystal shutters 200a and 200b for the light emission timing of the backlight 136 based on the information input into the input unit 138.

[(3) Example of Double Writing According to the Embodiment]

In the embodiment, in order to prevent crosstalk from occurring due to lack of liquid crystal's response speed, and lack of luminance, there is employed a method for increasing the drive frequency of the liquid crystal display panel and displaying (writing) one frame of the right and left images on the liquid crystal display panel 134 twice.

Figure 3:
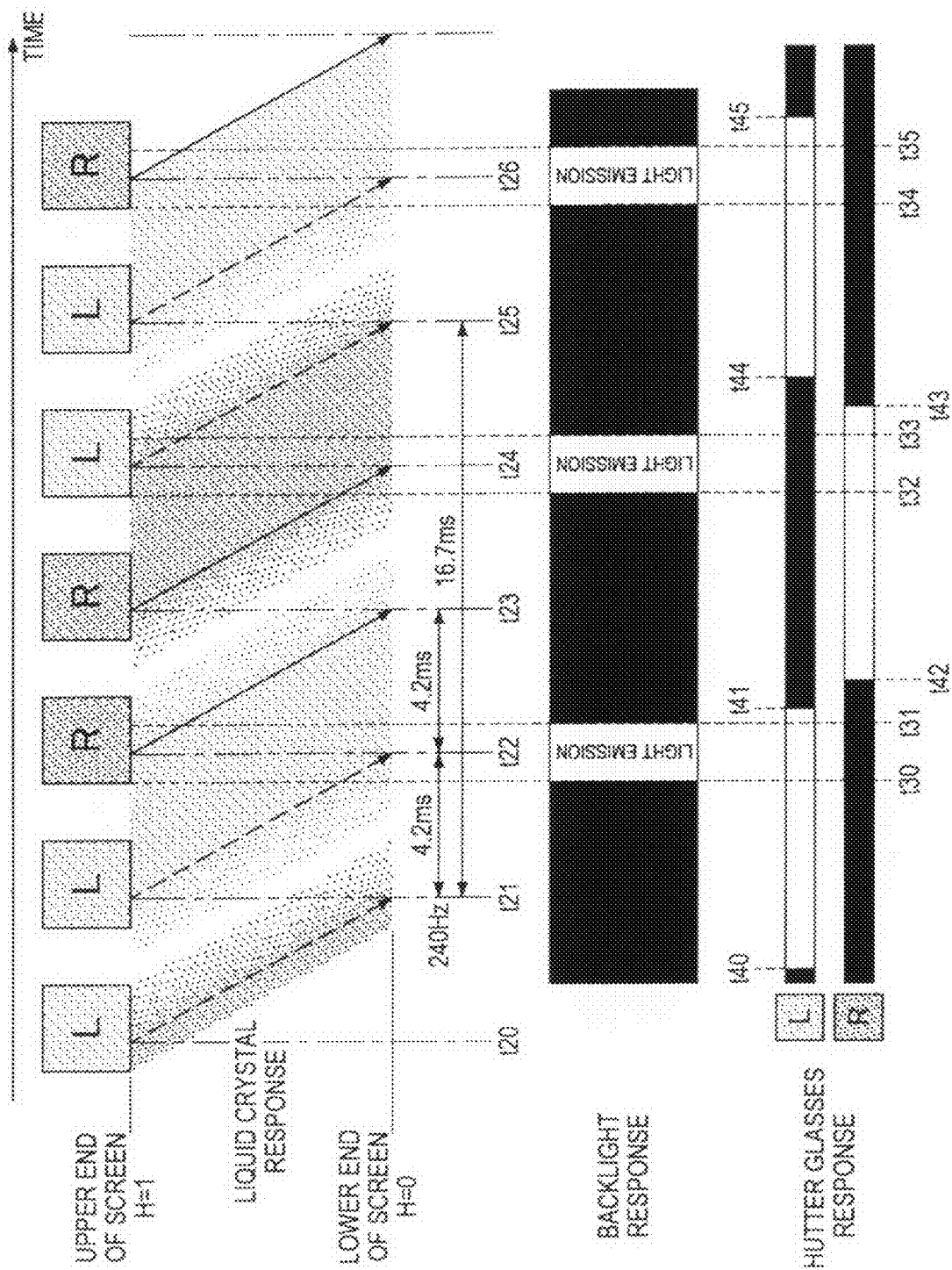
FIGS. 3A-3C are a timing chart showing a double writing principle and the opening/closing of liquid crystal shutters according to the embodiment.

FIG. 3 is a timing chart showing a double writing principle and the opening/closing of the liquid crystal shutters 200a and 200b according to the embodiment, and shows a case in which the right-eye image R and the left-eye image L are displayed at the drive frequency of 240[Hz], respectively. In FIG. 3, the time for which the right-eye image R or the left-eye image L is displayed by one writing is 1/240[Hz]=4.2 [ms].

FIG. 3A shows how the luminance changes over time at each position in the longitudinal direction from the lower end (H=0) of the screen on the liquid crystal display panel 134 to the upper end (H=1). FIG. 3B shows how the backlight 136 on the liquid crystal display panel 134 is emitted. FIG. 3C shows the opening/closing timing of the liquid crystal shutters 200a and 200b. As shown in FIGS. 3B and 3C, in the embodiment, the backlight 136 is lit in synchronization with the opening/closing of the liquid crystal shutters 200a and 200b.

As shown in FIG. 3, at the upper end (H=1) of the screen, the left-eye image L is written for 4.2 [ms] between times t20 and t21 and subsequently the left-eye image L is again written for 4.2 [ms] between times t21 and t22. The left-eye image L written between times t20 and t21 and the left-eye image L between times t21 and t22 are basically the same but may be different due to adjustment such as overdrive processing. A predetermined blank period may be provided between the first-written left-eye image L and the second-written left-eye image L.

Then, the left-eye image L is written twice and then the right-eye image R is written. Also for the right-eye image R, at the upper end (H=1) of the screen, the right-eye image R is written for 4.2 [ms] between times t22 and t23 and subsequently the right-eye image R is again written for 4.2 [ms] between times t23 and t24. The right-eye image R written between times t22 and t23 and the right-eye image R written between times t23 and t24 are basically the same but may be different due to adjustment such as overdrive processing. A predetermined blank period may be provided between the first-written right-eye image R and the second-written right-eye image R or between the left-eye image L and the right-eye image R.

Generally, since the response speed of the liquid crystal displaying apparatus is relatively slow, each pixel does not reach a desired luminance if the writing time is short. Thus, when the drive frequency is increased and the right-eye image R and the left-eye image L are alternately written, the time for one writing is short (=4.2 ms) and a desired luminance is reached only after the first writing, and thus there is not a timing at which both the upper end and the lower end of the screen reach the desired luminance.

In the embodiment, the right-eye image R and the left-eye image L are written twice, respectively so that a desired luminance can be held at the second writing, thereby achieving a state in which the desired luminance is reached at both the upper end and the lower end of the screen.

Then, in FIG. 3A, at time t22, the luminance of the left-eye image L reaches the desired level over the entire area from the upper side of the screen to the lower side of the screen. Therefore, the left-eye image L is recognized for a predetermined period (such as 2.1 ms) around time t22 so that the right-eye image R is not mixed into the left-eye image L over the entire area from the upper side of the screen to the lower side thereof, thereby accurately preventing crosstalk from occurring.

Similarly, also for the right-eye image R, at time t24 shown in FIG. 3A, the luminance of the right-eye image R reaches the desired level over the entire area from the upper side of the screen to the lower side thereof. Thus, the right-eye image R is recognized for a predetermined period (such as 2.1 ms) around time t24 so that the left-eye image L is not mixed into the right-eye image R, thereby accurately preventing crosstalk from occurring. Since the crosstalk and the luminance are in the tradeoff relationship, the illumination period of the backlight 136 can be appropriately set depending on which of the crosstalk and the luminance is dominant.

When the double writing is not performed unlike the embodiment, if the right-eye image R and the left-eye image L are alternately displayed at such a low frequency that the liquid crystal responds, flickering (flickered screen) will occur. The flickering occurs when the drive frequency at which one frame of the right-eye image R or the left-eye image L is displayed is 60 [Hz] or less, for example. In the embodiment, the drive frequency of the liquid crystal is at 240[Hz], for example, thereby accurately preventing the flickering from occurring.

[(4) Synchronization Between Backlight and Shutter Opening/Closing]

As shown in FIGS. 3B and 3C, in the embodiment, the backlight 136 is lit in synchronization with the opening/closing of the liquid crystal shutters 200a and 200b. The liquid crystal shutter 200b is opened between times t40 and t41 while the backlight 136 is lit between times t30 and t31 in synchronization with the opening/closing of the liquid crystal shutter 200b. As shown in FIGS. 3B and 3C, the period between times t40 and t41 in which the liquid crystal shutter 200b is opened is set to be sufficiently longer than the period between times t30 and t31 in which the backlight 136 is lit.

Similarly, the liquid crystal shutter 200a is opened between times t42 and t43 while the backlight 136 is lit between times t32 and t33 in synchronization with the opening/closing of the liquid crystal shutter 200a. The liquid crystal shutter 200b is opened between times t44 and t45 while the backlight 136 is lit between times t34 and t35 in synchronization with the opening/closing of the liquid crystal shutter 200b. As shown in FIG. 3B, the period between times t42 and t43 in which the liquid crystal shutter 200a is opened is set to be sufficiently longer than the period between times t32 and t33 in which the backlight 136 is lit. Similarly, the period between times t44 and t45 in which the liquid crystal shutter 200b is opened is set to be sufficiently longer than the period between times t34 and t35 in which the backlight 136 is lit.

If the period in which the liquid crystal shutter 200a or 200b is opened is short, a ratio of the period in which the liquid crystal shutter 200a or 200b transiently responds relative to the open period is made higher. Therefore, it is assumed that a sufficient light transmittance may not be secured during the open period.

In the embodiment, the period in which the liquid crystal shutter 200a or 200b is opened is sufficiently long and the backlight 136 is lit during the period in which the liquid crystal shutter 200a or 200b is opened. Thus, the backlight 136 is lit between times t30 and t31 and between times t34 and t35 so that the user can recognize the left-eye image L, and the backlight 136 is lit between times t32 and t33 so that the user can recognize the right-eye image R.

As described above, since a desired luminance is not reached at the lower side of the screen at the end of the first writing when the drive frequency of the liquid crystal is increased, the backlight 136 can be turned off for at least a certain period during the first writing in which the liquid crystal display panel 134 is transiently responding. More specifically, the backlight 136 can be turned off during the period of 4.2 ms corresponding to at least 500 of about 8.4 ms for which the right-eye image R or the left-eye image L is displayed. Thus, the video which is transiently responding via the first writing can be prevented from being recognized by the user.

In the embodiment, the backlight 136 is lit only for a predetermined time (such as 2.1 ms) around times t22, t24 and t26.

At time t24, the second writing of the right-eye image R is started at the lower side of the screen and the second writing of the right-eye image R is terminated at the upper side of the screen. Thus, the backlight 136 is lit at time t24 so that the first-written right-eye image R is not recognized by the user's right-eye and the second-written right-eye image R is recognized by the user's right-eye over the entire area from the lower side of the screen to the upper side thereof.

Similarly, at times t22 and t26, the second writing of the left-eye image L is started at the lower side of the screen and the second writing of the left-eye image L is terminated at the upper side of the screen. Thus, the backlight 136 is lit at time t22 or t26 so that the first-written left-eye image L may not be recognized by the user's left-eye. Thereby, the second-written left-eye image L can be recognized by the user's left-eye over the entire area from the lower side of the screen to the upper side thereof.

In this way, a desired luminance is reached at the first writing and the luminance is held at the second writing so that the backlight 136 is lit over the entire screen only for a certain period in which the second-written right-eye image R or left-eye image L is displayed. Thus, the video which has reached the desired luminance at the second writing can be recognized by the user. Therefore, at times t22, t24 and t26 shown in FIG. 3C, the backlight 136 is lit for a minimum predetermined time (such as 2.1 ms), thereby accurately preventing crosstalk from occurring.

Generally, in a system including an image displaying apparatus for alternately displaying a right-eye image R and a left-eye image L and a pair of display image viewing glasses for performing alternate opening/closing operation on liquid crystal shutters, there may occur characteristic factors such as lack of liquid crystal response speed of the image displaying apparatus or lack of contrast of the liquid crystal shutters. Then, due to the characteristic factors of the image displaying apparatus or the liquid crystal shutters, there may occur a crosstalk issue that part of the right-eye image R is mixed into the left-eye image L and part of the left-eye image L is leaked into the right-eye image R.

In the embodiment, as described above, the right and left images are consecutively displayed several times and the backlight 136 is lit when the liquid crystal responds in a 3D-TV using the liquid crystal display panel 134 having a relatively slow response speed, thereby largely preventing the crosstalk from occurring. The timing between the image display and the backlight 136 is appropriately set, thereby achieving a further decrease in the crosstalk.

[(5) Image Display Using Difference in Response Characteristics for Each Frequency in Liquid Crystal]

As described above, a STN or TN type liquid crystal, which desirably has high response characteristics, may be used for the liquid crystal shutters 200a and 200b of the display image viewing glasses 200. Since the liquid crystal has wavelength dispersion, the response characteristic for each frequency (each color) presents a different behavior for wavelength.

Figure 4:
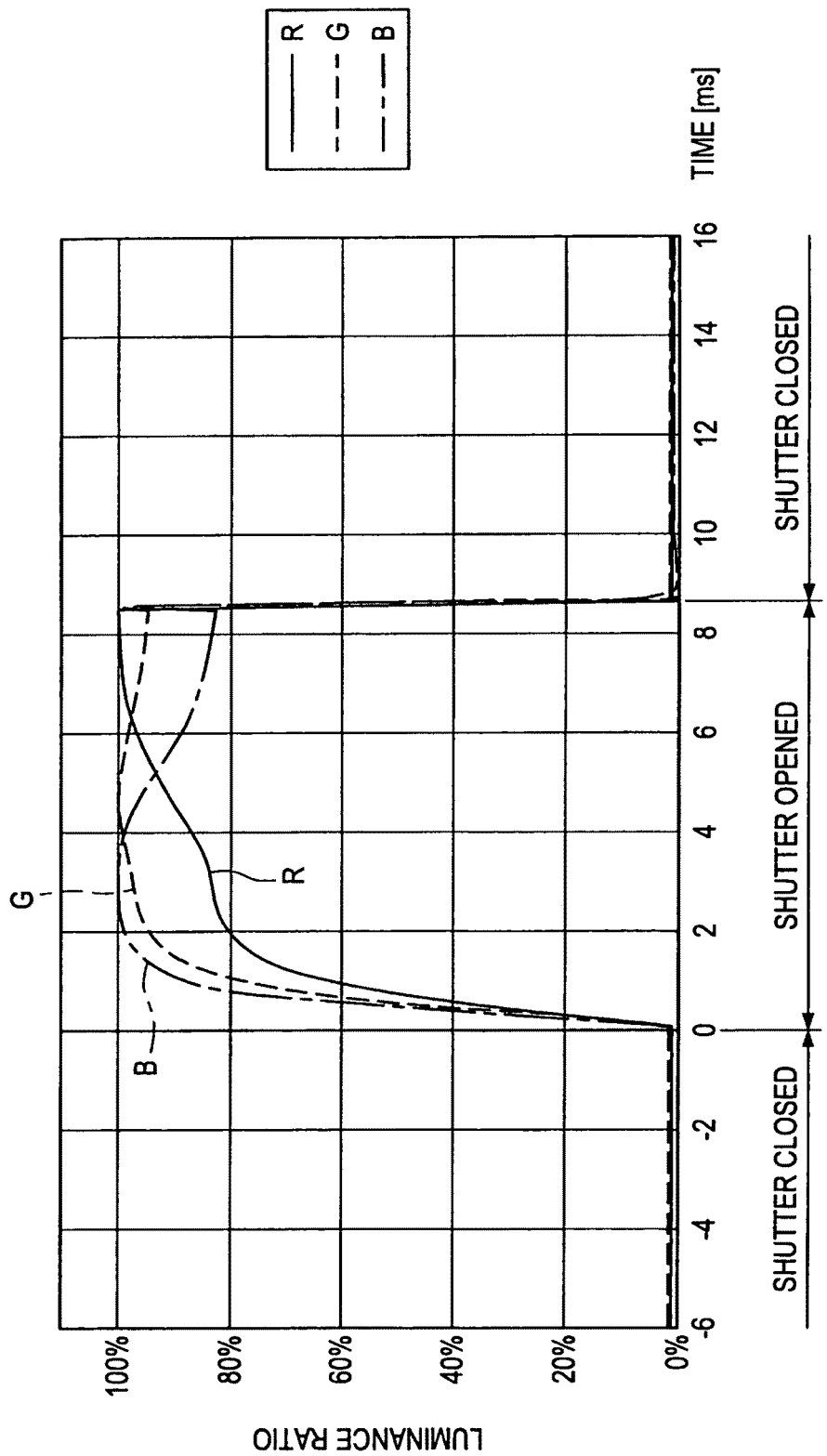
FIG. 4 is a characteristic diagram showing how a response characteristic of the liquid crystal is different for each R (red), G (green) or B (blue)

FIG. 4 is a characteristic diagram showing how the liquid crystal response characteristic is different for each color of R (red), G (green) or B (blue), where the horizontal axis indicates time and the vertical axis indicates liquid crystal luminance ratio (liquid crystal transmittance). The example of FIG. 4 shows a case in which the liquid crystal shutter 200a or 200b is opened at time 0 and the shutter is closed after 8 ms has elapsed since the opening of the shutter.

As shown in FIG. 4, for the response characteristic of blue (B), the response rising immediately after the shutter is opened is relatively fast, the luminance ratio (transmittance) is the highest (near 100%) in a range of 2 [ms] to 4 [ms] after the opening of the shutter, and then lowers. The rising response characteristic of green (G) is slightly slower than that of blue and the luminance ratio (transmittance) is the highest in a range of 4 [ms] to 6 [ms] after the opening of the shutter, and then lowers. On the other hand, the rising response characteristic of the red (R) is slower than those of blue and green and the luminance ratio is the highest after 6 [ms] is elapsed after the opening of the shutter.

In this way, the response characteristic of the liquid crystal transmittance after the opening of the shutter is different for each color of RGB. Thus, in the embodiment, the period in which the shutter is opened is changeable for the period in which the backlight 136 is lit such that the image having the highest luminance ratio for each color can be recognized.

The specific method will be described below. When the writing is performed several times and the backlight 136 is lit as described in FIG. 3, the liquid crystal shutters 200a and 200b (of STN type) having wavelength dispersion characteristic as shown in FIG. 4 are assumed to be used. In this case, when the backlight 136 is lit for 2 ms at a timing (subsequent to 4 ms in FIG. 4, for example) at which the liquid crystal sufficiently responds after the liquid crystal shutter 200a or 200b is opened, the backlight 136 is lit at a timing at which the blue transmittance characteristic is lowered so that the color transmitting the liquid crystal shutter 200a or 200b enters yellow. On the other hand, when the backlight 136 is lit for 2 ms (subsequent to 2 ms in FIG. 4, for example) immediately after the liquid crystal shutter 200a or 200b is opened, the backlight 136 is lit at a timing at which the blue transmittance characteristic is high so that the color transmitting the liquid crystal shutter 200a or 200b enters blue. Thus, the timing of opening the liquid crystal shutter 200a or 200b is set to be changeable for the timing of lighting the backlight 136, thereby changing an image color (color temperature).

A typical 2D television receiver includes a display mode or a function capable of changing a color temperature via user setting and naturally a similar function is needed also for a 3D image displaying apparatus. However, in the above example, for example, when the color of the image transmitting the liquid crystal shutter 200a or 200b is yellow (when the color temperature is middle), if the color temperature is tried to be adjusted toward blue (toward higher color temperature) via a signal processing at the image displaying apparatus 100 side, the green and red signals need to be weakened. In this case, there is an issue that the signals are weakened so that a decrease in the luminance is remarkably large and the amount of light of the image displayed on the liquid crystal display panel 134 is lack. In particular, since green has a great impact on the luminance, if the green signal is weakened, a decrease in the luminance is remarkable. As one example, when the color temperature is adjusted from low to high, the luminance is reduced by about 30%, and when the color temperature is adjusted from low to middle, the luminance is reduced by about 20%. In the embodiment, since the timing of opening the liquid crystal shutter 200a or 200b is relatively changeable for the timing of lighting the backlight 136 so that the color temperature is adjusted, the luminance can be reduced to below 10% both in the adjustment from low temperature to middle temperature and in the adjustment from low temperature to high temperature.

Thus, in the embodiment, the timing of opening the liquid crystal shutter 200a or 200b is adjusted for the timing of lighting the backlight 136 in consideration of the response characteristics of FIG. 4 so that the color of the image transmitting the liquid crystal shutter 200a or 200b is changeable. In the following, with reference to FIGS. 5 and 6, there will be described a method for adjusting a light emitting timing of the backlight 136 for the timing of opening the liquid crystal shutter 200a or 200b and thus adjusting the color temperature of the light transmitting the liquid crystal shutter 200a or 200b to be low, middle or high, respectively. FIG. 5 is a schematic diagram showing an example in which a period of opening the liquid crystal shutter 200a or 200b is changeable with respect to FIG. 3. FIG. 6 shows the same characteristic as FIG. 4, and is a characteristic diagram showing how the color temperature changes in response to an illumination timing of the backlight 136.

FIGS. 5A and 5B show the same characteristics as FIGS. 3A and 3B. FIG. 5C shows a case in which the color temperature is adjusted to be low, FIG. 5D shows a case in which the color temperature is adjusted to be middle, and FIG. 5E shows a case in which the color temperature is adjusted to be high.

As shown in FIG. 5A, when the color temperature is adjusted to be low, the timing of opening the liquid crystal shutter 200a or 200b is adjusted such that the period in which the backlight 136 is being illuminated is the second-half period in which the liquid crystal shutter 200a or 200b is opened. As shown in FIG. 6, since the red transmittance of the liquid crystal shutter 200a or 200b is high and the blue and green transmittances are low during the second-half period (period of about 6 ms to 8 ms after the opening of the shutter) in which the liquid crystal shutter 200a or 200b is opened, when the backlight 136 is illuminated at this timing for transmitting the image through the liquid crystal shutter 200a or 200b, the color temperature of the video to be recognized by the user can be set low. Further, the color temperature by a typical video signal is finely adjusted at the image displaying apparatus 100 side, so that the color temperature can be adjusted with higher accuracy. In this case, as compared with the case in which all the adjustments of the color temperature are made at the image processing apparatus side, the amount of signal adjustment at the image processing apparatus 100 is remarkably reduced and particularly the amount of green adjustment can be reduced, thereby making adjustments without a decrease in the luminance.

As shown in FIG. 5E, when the color temperature is adjusted to be high, the timing of opening the liquid crystal shutter 200a or 200b is adjusted such that the period in which the backlight 136 is being illuminated is the first-half period in which the liquid crystal shutter 200a or 200b is opened. As shown in FIG. 6, since the blue transmittance of the liquid crystal shutter 200a or 200b is high and the red and green transmittances are low during the first-half period (period of about 1 ms to 4 ms after the opening of the shutter) in which the liquid crystal shutter 200a or 200b is opened, the backlight 136 is illuminated at this timing for transmitting the image through the liquid crystal shutter 200a or 200b so that the color temperature of the image to be recognized by the user can be set high. Also in this case, the color temperature by a typical video signal is finely adjusted at the image displaying apparatus 100 side so that the color temperature can be adjusted with higher accuracy. As compared with the case in which all the adjustments of the color temperature are made at the image processing apparatus side, the amount of signal adjustment at the image processing apparatus 100 side is remarkably reduced and particularly the amount of green adjustment can be reduced, thereby making adjustments without a decrease in the luminance.

As shown in FIG. 5D, when the color temperature is adjusted to be middle, the timing of opening the liquid crystal shutter 200a or 200b is adjusted such that the period in which the backlight 136 is being illuminated is the middle period in which the liquid crystal shutter 200a or 200b is opened. As shown in FIG. 6, since the green transmittance of the liquid crystal shutter 200a or 200b is high and the blue and red transmittances are low during the middle period (period of about 4 ms to 6 ms after the opening of the shutter) in which the liquid crystal shutter 200a or 200b is opened, the backlight 136 is illuminated at this timing for transmitting the image through the liquid crystal shutter 200a or 200b, thereby adjusting the color temperature of the video to be recognized by the user to be middle.

The opening timing of the liquid crystal shutter 200a or 200b is adjusted by the shutter control unit 122 shown in FIG. 2. The shutter control unit 122 controls the opening timing of the liquid crystal shutters 200a and 200b based on the color temperature control signal input from the input unit 138 and sends a drive signal for emitting the emitter 124 based on the determined opening timing to the emitter 124. Thus, the viewing glasses 200 perform the alternate opening/closing operation on the liquid crystal shutters 200a and 200b in synchronization with the opening/closing timing of the liquid crystal shutters 200a and 200b indicated by the optical signal.

The liquid crystal shutters 200a and 200b are desirably wavelength-dependent from the above viewpoint. The liquid crystal having high wavelength dependency may include STN (Super Twisted Nematic liquid crystal) type, TN (Twisted Nematic liquid crystal) type, VA (Vertical Alignment) type, and OCB (Optically Compensated Bend; π cell) type liquid crystals. The kinds of the liquid crystal are not limited thereto.

In the above example, as shown in FIGS. 5A and 5B, the illumination timing of the backlight 136 is unchangeable for the timing of writing the right and left videos similar to FIG. 3 and the time for which the liquid crystal shutter 200a or 200b is opened is at a fixed value. Then, the opening timing of the liquid crystal shutter 200a or 200b is changed for the illumination timing of the backlight 136 so that the color temperature is adjusted. Thus, as described in FIG. 3, the period in which the backlight 136 is being illuminated is not changed for the writing of the right and left videos, thereby accurately preventing crosstalk from occurring.

Further, the panel signal is adjusted and the color temperature is adjusted at the image displaying apparatus 100 side at the same time with the adjustment of the opening timing of the liquid crystal shutters 200a and 200b, thereby expressing the target color temperature more accurately.

[(6) Control and Others of Backlight Off Period]

In FIG. 3, the backlight 136 is turned off or emitted with a dark color such as gray during the periods other than between times t30 and t31, between times t32 and t33 and between times t34 and t35. The case of FIG. 5 is also similar. Since the liquid crystal responsiveness is temperature-dependent, if the liquid crystal which does not have a sufficient responsiveness at a used temperature is used, for example, the backlight 136 is desirably lit with a dark color such as gray without being completely turned off also during the periods other than the periods in which the backlight 136 is lit. Therefore, it is possible to prevent the temperature of the backlight 136 and the liquid crystal display panel 134 from lowering during the periods other than the lighting periods and thus to accurately prevent the responsiveness of the liquid crystal from lowering.

In this way, in the embodiment, the backlight 136 is lit at the timing at which the liquid crystal shutter 200a or 200b is opened, and the luminance of the backlight 136 is lowered during other periods. Thus, the contrast of the liquid crystal display panel 134 can be enhanced both in the opened state and in the closed state of the liquid crystal shutters 200a and 200b, so that the user can recognize the right-eye image R or the left-eye image L only during the period in which the backlight 136 is lit.

In particular, with the structure using the liquid crystal shutters 200*a* and 200*b* like the display image viewing glasses 200 according to the embodiment, the light transmittance in the shutter-opened state is slightly lowered due to the liquid crystal transmittance. A leaked light transmits through the liquid crystal shutters also in the shutter-closed state. Thus, the contrast between the opened state and the closed state of the liquid crystal shutters may not be sufficiently enhanced. In this case, the luminance of the video can be lowered in the shutter-opened state and the crosstalk can occur due to a leaked light in the shutter-closed state.

In the example of the embodiment shown in FIG. 3, the luminance of the backlight 136 is lowered other than between times t30 and t31, between times t32 and t33 and between times t34 and t35. For that reason, the light can be accurately prevented from transmitting through the liquid crystal shutters 200*a* and 200*b* in the state either the liquid crystal shutter 200*a* or the liquid crystal shutter 200*b* is closed. Therefore, the video with the leaked light can be prevented from being recognized by the user in the state where the liquid crystal shutter 200*a* or 200*b* is closed, thereby accurately preventing the crosstalk from occurring.

In the examples shown in FIGS. 3 and 5, the luminance of the backlight 136 is enhanced only in the predetermined periods in synchronization with the opening/closing of the liquid crystal shutters 200*a* and 200*b*. Thus, the luminance at the lighting can be made higher than that when the backlight 136 is continuously being lit in the 2D image display. In other words, since the luminance of the backlight 136 is enhanced only in the predetermined periods, even if the luminance at the light emission is enhanced, the similar life (usable life) to that when the backlight is continuously being lit can be held. Thus, with the structure of the present embodiment, the luminance at the lighting can be made higher than that when the backlight 136 is continuously being lit, so that the contrast of the liquid crystal display panel 134 can be more enhanced in the opened state and in the closed state of the liquid crystal shutters 200*a* and 200*b*.

As described above, according to the embodiment, the lack of contrast of the liquid crystal shutters 200*a* and 200*b* can be compensated for by the contrast of the backlight 136. Thus, the user can recognize a desired video having high luminance by the light emission of the backlight 136 in the shutter-opened state, and can recognize the video without crosstalk which is due to a decrease in the luminance of the backlight 136 in the shutter-closed state. Although the double writing and the synchronization between the backlight 136 and the shutter opening/closing are used together in the embodiment, the crosstalk can be prevented from occurring even if only the synchronization between the backlight 136 and the shutter opening/closing is performed without the double writing, thereby achieving a desired luminance.

[(7) Application to System for Periodically Displaying Multiple Different Images]

Figure 7:
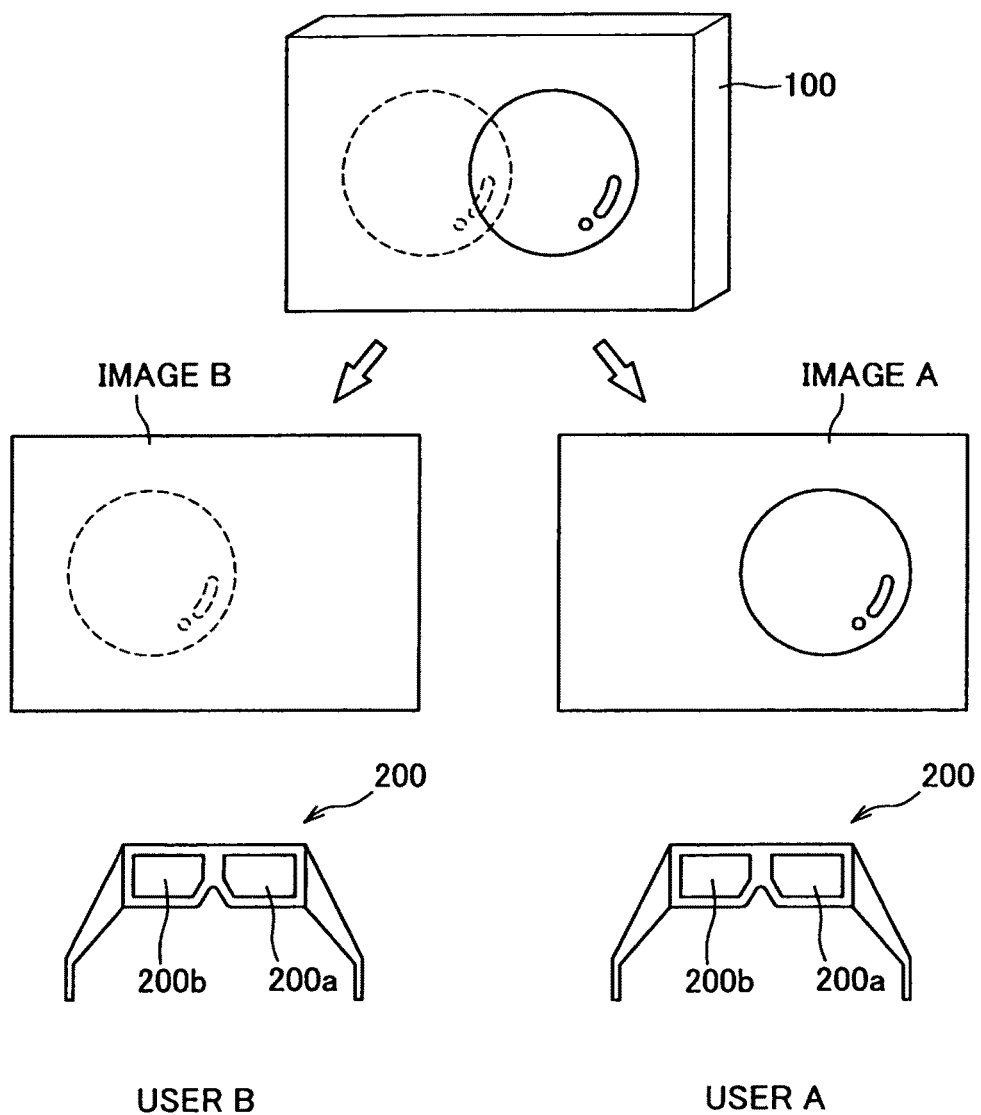
FIG. 7 is a schematic diagram showing a system (Dual View) for providing different videos for a plurality of users.

The stereoscopic image display observing system has been exemplified in the above example, but may be applied to a system for providing different videos for a plurality of users. FIG. 7 is a schematic diagram showing a system (Dual View) for providing different videos for a plurality of users. In the system, the liquid crystal shutters 200*a* and 200*b* of the display image viewing glasses 200 perform the opening/closing operation at the same timing. The image displaying apparatus 100 is a time-division displaying apparatus, for example, and alternately displays a video for user A and a video for user B in a very short period.

The liquid crystal shutters 200*a* and 200*b* simultaneously perform the opening/closing operation in synchronization with the image switching for each field of the image displaying apparatus 100. In other words, in the field in which the image A for user A is displayed on the image displaying apparatus 100, the liquid crystal shutters 200*a* and 200*b* of the user A-wearing display image viewing glasses 200 are opened. On the other hand, the liquid crystal shutters 200*a* and 200*b* of the user B-wearing display image viewing glasses 200 are closed.

In the field in which the image B for user B is displayed on the image displaying apparatus 100, the liquid crystal shutters 200*a* and 200*b* of the user B-wearing display image viewing glasses 200 are opened. On the other hand, the liquid crystal shutters 200*a* and 200*b* of the user A-wearing display image viewing glasses 200 are closed.

In this manner, the image displaying apparatus 100 alternately displays the image A for user A and the image B for user B on the entire screen in a very short period, and opens or closes the individual user's liquid crystal shutters 200*a* and 200*b* in synchronization with the display timing of the image A and the image B. Thus, it is possible to provide different videos for user A and user B. FIG. 7 exemplifies the case of two users, but the image displaying apparatus can be constituted also for more users.

The basic structure of the image displaying apparatus 100 in the system of FIG. 7 is similar to that of FIG. 2. The video signal control unit 120 functions to control video signals for multiple users, and the video signals for displaying the image A and the image B are input into the signal control unit 120. The video signal control unit 120 alternately outputs the video signals for the image A and the image B for alternately displaying the image A and the image B on the liquid crystal display panel 134. The video signal control unit 120 performs the similar double writing based on the input video signals and thus converts the video signal for the image A and the video signal for the image B such that two of the same signals are consecutive.

The video signal for the image A and the video signal for the image B, which have been converted in the video signal control unit 120, are input into the timing control unit 126. The timing control unit 126 converts the input video signals into the signals to be input into the liquid crystal display panel 134, and generates a pulse signal to be used for the operations of the gate driver 130 and the data driver 132.

Further, the video signal control unit 120 sends the timing signal indicating the timing of switching the video signal for the image A and the video signal for the image B, which are converted to be two-consecutive, to the shutter control unit 122. The shutter control unit 122 sends a drive signal for emitting the emitter 124 to the emitter 124 based on the timing signal sent from the video signal control unit 120. The drive signal for emitting the emitter 124 is a signal containing the opening/closing timing of the liquid crystal shutters 200*a* and 200*b* corresponding to an individual user. The shutter control unit 122 controls the opening/closing timing of the liquid crystal shutters 200*a* and 200*b* based on the timing signal sent from the video signal control unit 120 and the information input from the input unit 138. The emitter 124 sends an optical signal indicating the opening/closing timing of the right and left liquid crystal shutters 200*a* and 200*b* to the viewing glasses 200 based on the drive signal sent from the shutter control unit 122. The shutter control unit 122 sends a timing signal indicating a timing of switching the image A and the image B to the backlight control unit 128.

Also in the system shown in FIG. 7, the opening timing of the liquid crystal shutters 200*a* and 200*b* can be changed for the period in which the backlight 136 is being lit according to the response characteristic of each color of the liquid crystal similar to the above stereoscopic image display observing system. Thus, the desirably colored image can be realized without decreasing the luminance of the image.

According to the embodiment described above, the opening timing of the liquid crystal shutters 200*a* and 200*b* can be changed for the period in which the backlight 136 is being lit according to the response characteristic of each color of the liquid crystal. Therefore, the desirably colored image can be realized without decreasing the luminance of the image. As compared with the case in which the image color is adjusted at the display panel side, the decrease in the luminance can be remarkably restricted.

The preferred embodiment of the present invention has been described above with reference to the appended drawings but the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. An image displaying apparatus comprising:
   a signal control unit for receiving an input image signal and converting the signal into a signal for alternately displaying a right-eye image and a left-eye image;
   display panel into which the signal converted in the signal control unit is input for alternately displaying the right-eye image and the left-eye image;
   a surface light source for illuminating the display panel from its back;
   a shutter control unit for generating a timing signal indicating a period in which the right-eye and left-eye shutters are opened for a pair of viewing glasses with the right-eye and left-eye shutters, and for relatively changing the shutter-opened period for the emission timing of the surface light source; and
   a surface light source control unit for emitting the surface light source in a shorter period than the shutter-opened period in response to the switching between the right-eye image and the left-eye image,
   wherein the shutter control unit changes the shutter-opened period based on adjusted changes in color temperature of an image.

2. An image displaying apparatus comprising:
   a signal control unit for receiving an input image signal and converting the signal into a signal for alternately displaying a right-eye image and a left-eye image;
   display panel into which the signal converted in the signal control unit is input for alternately displaying the right-eye image and the left-eye image;
   a surface light source for illuminating the display panel from its back;
   a shutter control unit for generating a timing signal indicating a period in which the right-eye and left-eye shutters are opened for a pair of viewing glasses with the right-eye and left-eye shutters, and for relatively changing the shutter-opened period for the emission timing of the surface light source;
   a surface light source control unit for emitting the surface light source in a shorter period than the shutter-opened period in response to the switching between the right-eye image and the left-eye image; and
   an input unit into which information for adjusting an image color is input,
   wherein the shutter control unit changes the shutter-opened period based on the information input into the input unit.

3. The image displaying apparatus according to claim 2, wherein when information for increasing a color temperature of an image is input into the input unit, the timing control unit relatively delays a timing of the shutter-opened period for the emission timing of the surface light source.

4. The image displaying apparatus according to claim 2, wherein when information for reducing a color temperature of an image is input into the input unit, the shutter control unit relatively quickens a timing of the shutter-opened period for the emission timing of the surface light source.

5. The image displaying apparatus according to claim 2, wherein the shutter is of STN type, TN type, VA type or OCB type liquid crystal.

6. The image displaying apparatus according to claim 2, wherein the signal control unit converts the right-eye video signal and the left-eye video signal into the signals such that the same signal is consecutively displayed at least twice, respectively.

7. The image displaying apparatus according to claim 6, wherein the surface light source control unit emits the surface light source during at least part of the second display period of the right-eye image and the left-eye image.

8. The image displaying apparatus according to claim 6, wherein the surface light source control unit does not emit the surface light source during at least part of the first display period of the right-eye image and the left-eye image.

9. An image displaying method comprising the steps of:
   receiving an input image signal and converting the signal into a signal for alternately displaying a right-eye image and a left-eye image;
   alternately displaying the right-eye image and the left-eye image based on the converted signal;
   generating a timing signal indicating a period in which the right-eye and left-eye shutters are opened for a pair of viewing glasses with the right-eye and left-eye shutters, and for relatively changing the shutter-opened period for the emission timing of the surface light source of the display panel for displaying the right-eye image and the left-eye image; and
   emitting the surface light source in a shorter period than the shutter-opened period in response to the switching between the right-eye image and the left-eye image,
   wherein the generating and changing step changes the shutter-opened period based on adjusted changes in color temperature of an image.

10. An image displaying apparatus comprising:
   a signal control unit for receiving an input image signal and converting the signal into a signal for periodically displaying multiple different images;
   a display panel into which the signal converted in the signal control unit is input for periodically displaying the multiple different images;
   a surface light source for illuminating the display panel from its back;
   a shutter control unit for generating a timing signal indicating a period in which the right-eye and left-eye shutters are simultaneously opened at a timing of displaying the multiple different images for a pair of viewing glasses with the right-eye and left-eye shutters, and for relatively changing the shutter-opened period for the emission timing of the surface light source; and
   a surface light source control unit for emitting the surface light source in a shorter period than the shutter-opened period in response to the switching between the right-eye image and the left-eye image, wherein the shutter control unit changes the shutter-opened period based on adjusted changes in color temperature of an image.

11. An image display observing system comprising:

an image displaying apparatus including a signal control unit for receiving an input image signal and converting the signal for periodically displaying multiple different images, a display panel into which the signal converted in the signal control unit is input for periodically displaying the multiple different images, a surface light source for illuminating the display panel from its back, a shutter control unit for generating a timing signal indicating a period in which the right-eye and left-eye shutters are simultaneously opened at a timing of displaying the multiple different images for a pair of viewing glasses with the right-eye and left-eye shutters, and for relatively changing the shutter-opened period for the emission timing of the surface light source, and a surface light source control unit for emitting the surface light source in a shorter period than the shutter-opened period in response to the switching between the right-eye image and the left-eye image; and the viewing glasses with the right-eye and left-eye shutters for alternatively opening the right-eye and left-eye shutters based on the timing signal, wherein the shutter control unit changes the shutter-opened period based on adjusted changes in color temperature of an image.

12. An image displaying method comprising the steps of:

outputting a signal for periodically displaying multiple different images;

periodically displaying the multiple different images based on the signal;

generating a timing signal indicating a period in which the right-eye and left-eye shutters are simultaneously opened at a timing of displaying the multiple different images for a pair of viewing glasses with the right-eye and left-eye shutters, and for relatively changing the shutter-opened period for the emission timing of the surface light source of the display panel; and emitting the surface light source in a shorter period than the shutter-opened period in response to the switching between the right-eye image and the left-eye image, wherein the generating and changing step changes the shutter-opened period based on adjusted changes in color temperature of an image.

* * * * *